United States Patent
Purnell et al.

(10) Patent No.: US 12,136,000 B2
(45) Date of Patent: Nov. 5, 2024

(54) PROGRAMMING FLOW FOR MULTI-PROCESSOR SYSTEM

(71) Applicant: Coherent Logix, Incorporated, Austin, TX (US)

(72) Inventors: Michael L. Purnell, Scotts Valley, CA (US); Geoffrey N. Ellis, Santa Cruz, CA (US); Teng-I Wang, Yorba Linda, CA (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

(21) Appl. No.: 18/136,976

(22) Filed: Apr. 20, 2023

(65) Prior Publication Data

US 2023/0359509 A1 Nov. 9, 2023

Related U.S. Application Data

(63) Continuation of application No. 16/177,680, filed on Nov. 1, 2018, now Pat. No. 11,755,382.
(Continued)

(51) Int. Cl.
*G06F 9/50* (2006.01)
*G06F 8/41* (2018.01)
(Continued)

(52) U.S. Cl.
CPC ............ *G06F 9/5077* (2013.01); *G06F 8/443* (2013.01); *G06F 9/3877* (2013.01);
(Continued)

(58) Field of Classification Search
None
See application file for complete search history.

(56) References Cited

U.S. PATENT DOCUMENTS

| 7,853,937 | B2 | 12/2010 | Janczewski |
| 8,001,266 | B1 | 8/2011 | Gonzalez |

(Continued)

FOREIGN PATENT DOCUMENTS

| JP | 0380337 A | 4/1991 |
| JP | 2015125503 A | 7/2015 |
| TW | 201423402 A | 6/2014 |

OTHER PUBLICATIONS

Koichi Nakamura, Auto Loop Parallelization for SIMD Architecture, IPSJ SIG Technical Reports 2010 (CD-ROM), Uapan, Information Processing Society of Japan, Oct. 15, 2010, pp. 1-8.
(Continued)

*Primary Examiner* — Wynuel S Aquino
(74) *Attorney, Agent, or Firm* — Kowert, Hood, Munyon, Rankin & Goetzel, P.C.; Jeffrey C. Hood

(57) ABSTRACT

Various embodiments are disclosed of a compilation with optimization for multi-processor system with processing elements optimized for high performance and low power dissipation and an associated method of programming the processing elements. Application source code may be initially compiled into an intermediate representation. Following the initial compilation, resources may be mapped and communication synthesis performed. Simulation and debug may be performed prior to loading an executable image onto the multi-processor system. At each step, checks may be performed for possible optimizations, and one or more steps repeated using results of the checks.

20 Claims, 11 Drawing Sheets

Related U.S. Application Data

(60) Provisional application No. 62/581,525, filed on Nov. 3, 2017.

(51) Int. Cl.
 *G06F 9/38* (2018.01)
 *G06F 13/28* (2006.01)

(52) U.S. Cl.
 CPC .......... *G06F 9/5038* (2013.01); *G06F 9/5066* (2013.01); *G06F 13/28* (2013.01)

(56) References Cited

U.S. PATENT DOCUMENTS

| | | | |
|---|---|---|---|
| 8,359,586 | B1 | 1/2013 | Orofino et al. |
| 8,566,804 | B1* | 10/2013 | Carrick ................. G06F 9/5066 703/22 |
| 8,826,228 | B2 | 9/2014 | Beardslee |
| 9,274,771 | B1 | 3/2016 | Kalogeropulos |
| 9,405,866 | B1 | 8/2016 | Cho et al. |
| 9,817,931 | B1 | 11/2017 | Gu et al. |
| 10,261,760 | B1* | 4/2019 | Gu ........................ G06F 30/327 |
| 2005/0071832 | A1 | 3/2005 | Kawahito |
| 2006/0026578 | A1 | 2/2006 | Ramchandran et al. |
| 2006/0218543 | A1 | 9/2006 | Boger |
| 2007/0226686 | A1 | 9/2007 | Beardslee et al. |
| 2007/0294681 | A1 | 12/2007 | Tuck et al. |
| 2009/0113434 | A1* | 4/2009 | Podila ................... G06F 9/5072 718/102 |
| 2009/0228224 | A1* | 9/2009 | Spanier .................. G01R 19/00 702/188 |
| 2011/0067018 | A1 | 3/2011 | Kawachiya et al. |
| 2011/0231616 | A1 | 9/2011 | Lin |
| 2012/0254879 | A1 | 10/2012 | Chung et al. |
| 2013/0117548 | A1 | 5/2013 | Grover et al. |
| 2013/0139119 | A1 | 5/2013 | Hidvegi et al. |
| 2013/0198494 | A1 | 8/2013 | Grover et al. |
| 2014/0040855 | A1 | 2/2014 | Wang et al. |
| 2014/0101636 | A1 | 4/2014 | Correll et al. |
| 2014/0351551 | A1 | 11/2014 | Doerr et al. |
| 2016/0019326 | A1 | 1/2016 | Tal et al. |
| 2016/0139900 | A1 | 5/2016 | Pudiyapura et al. |
| 2016/0307362 | A1 | 10/2016 | Farrell et al. |
| 2017/0255468 | A1 | 9/2017 | Bequet et al. |
| 2017/0262567 | A1 | 9/2017 | Vassiliev |
| 2018/0095883 | A1* | 4/2018 | Polishuk ............... G06F 12/126 |
| 2018/0139130 | A1* | 5/2018 | Crickett ................. H04L 45/64 |
| 2020/0057681 | A1 | 2/2020 | Mamaghani et al. |

OTHER PUBLICATIONS

Miki Otonari, Integrated Parallelizing Compiler System, IPSJ SIG Technical Reports vol. 91, No. 23, pp. 1-8, Japan, Information Processing Society of Japan, Mar. 11, 1991.

Guo Jichi et al: "Compiler-Assisted Overlapping of Communication and Computation in MPI Applications", 2016 IEEE International Conference on Cluster Computing (Cluster), IEEE, Sep. 12, 2016 (Sep. 12, 2016), pp. 60-69, XP033018859, DOI: 10.1109/CLUSTER. 2016.62 [retrieved on Dec. 6, 2016].

Anthony Danalis et al: "MPI-aware compiler optimizations for improving communication-computation overlap", EPO Form 2906 01 .91TRI Proceedings of the 2009 ACM SIGARCH International Conference on Supercomputing: Yorktown Heights, New York, USA, Jun. 8-12, 2009, ACM, New York, NY, Jun. 8, 2009 (Jun. 8, 2009), pp. 316-325, XP058164646, DOI: 10.1145/1542275. 1542321 ISBN: 978-1-60558-498-0.

Xu Zhilei et al: "MSL: A Synthesis Enabled Language for Distributed Implementations", SC14: International Conference for High Performance Computing, Networking, Storage and Analysis, IEEE, Nov. 16, 2014 (Nov. 16, 2014), pp. 311-322, XP032725142, DOI: 10.1109/SC.2014.31 [retrieved on Jan. 16, 2015].

Communication pursuant to Article 94(3) EPC in European Application No. 18 804 827.6, dated Jul. 21, 2022, 6 pgs.

Office Action in European Application No. 18804827.6 dated Jul. 21, 2022, 8 pages.

International Search Report and Written Opinion for International Application No. PCT/US2018/058700 mailed Feb. 14, 2019, 13 pages.

Zain Ul-Abdin et al, "A Retargetable Compilation Framework for Heterogeneous Reconfigurable Computing," ACM Transactions on Reconfigurable Technology and Systems, ACM, US., vol. 9, No. 4, Publication date: Aug. 11, 2016, pp. 1-22.

Srinivas Boppu, et al., "Compact Code Generation for Tightly-Coupled Processor Arrays," Journal of Signal Processing Systems, Springer, US, vol. 77, No. 1, Publication date: Mar. 31, 2014, pp. 5-29.

Office Action for Taiwan Patent Application No. 107139064 dated Dec. 20, 2019, 4 pages.

Papakonstantinou, Alexandros, et al. "FCUDA: Enabling efficient compilation of CUDA kernels onto FPGAs." Jul. 27, 2009. 2009 IEEE 7th Symposium on Application Specific Processors. IEEE. (Year: 2009).

Wang, Chao, et al. "FPM: A flexible programming model for MPSoC on FPGA." May 21, 2012. 2012 IEEE 26th International Parallel and Distributed Processing Symposium Workshops & PhD Forum. IEEE. (Year: 2012).

Jain, Abhishek Kumar et al. "Resource-aware just-in-time OpenCL compiler for coarse-grained FPGA overlays." May 8, 2017. arXiv preprint arXiv: 1705.02730 (2017). (Year: 2017).

Summons to attend oral proceedings pursuant to Rule 115(1) EPC, EP Application No. 18 804 827.6, dated Jun. 23, 2023, 11 pages.

Tong Lin et al: "A framework to improve programmability of low power many-core processor for scalable DSP application", 2013 IEEE Global Conference on Signal and Information Processing, IEEE, Dec. 3, 2013 (Dec. 3, 2013), pp. 658-662, XP032566595, DOI: 10.1109/GLOBALSIP.2013.6736977 [retrieved on Feb. 10, 2014].

Anghel Andreea-Simona: "On Large-Scale System Performance Analysis and Software Characterization", Jul. 26, 2017 (Jul. 26, 2017), XP093051680, DOI: 10.3929/ethz-b-000212482 Retrieved from the Internet: URL:https ://www.research-collection.ethz.ch/ bitstream/handle/20.500.11850/212482/1/thesis_research_collection_ no_CV.pdf [retrieved on Jun. 5, 2023].

Mazo: "Programming Heterogeneous MPSoCs: Tool Flows to Close the Software Productivity Gap", Apr. 9, 2013 (Apr. 9, 2013), XP093051644, Retrieved from the Internet: URL:http://publications. rwth-aachen.de/record/211242/files/4534.pdf [retrieved on Jun. 5, 2023].

Brandner Florian et al: "Fast and Accurate Simulation using the LLVM Compiler Framework", Jan. 1, 2009 (Jan. 1, 2009), XP093052533, Retrieved from the Internet:URL:http://ftp.complang. tuwien.ac.at/andi/papers/rapido_09. pdf [retrieved on Jun. 7, 2023].

Huang Qijing et al: "The Effect of Compiler Optimizations on High-Level Synthesis-Generated Hardware", ACM Transactions on Reconfigurable Technology and Systems, vol. 8, No. 3, May 19, 2015 (May 19, 2015), pp. 1-26, XP093052537, US ISSN: 1936-7406, DOI: 10.1145/2629547 Retrieved from the Internet: URL:https:// dl.acm.org/doi/pdf/10.1145/2629547? casa_token= Tzv9aMwuOsQAAAAA:HI5rz3MGwNoSmaEiWZBYxHW_ LY4H9bmAXqKsOb-5_1C_Snj5hBXLw_g_fxGy9yRakE8Ki-DnPfWW.

John Irza et al: "A third generation many-core processor for secure embedded computing systems", High Performance Extreme Computing (HPEC), 2012 IEEE Conference on, IEEE, Sep. 10, 2012 (Sep. 10, 2012), pp. 1-3, XP032301792, DOI: 10.1109/HPEC.2012. 6408657 ISBN: 978-1-4673-1577-7.

Notice of Reason for Refusal, JP Application No. JP2020-524794 (translation), Apr. 18, 2023, 5 pages.

* cited by examiner

PROGRAMMING FLOW FOR MULTI-PROCESSOR SYSTEM

PRIORITY CLAIM

This application is a continuation of U.S. patent application Ser. No. 16/177,680, titled "Programming Flow for Multi-Processor System", filed on Nov. 1, 2018, which claims benefit of priority to U.S. Provisional Application No. 62/581,525 titled "Programming Flow for Multi-Processor System", filed on Nov. 3, 2017, all of which are hereby incorporated by reference as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

INCORPORATION BY REFERENCE

U.S. Pat. No. 9,430,369 titled "Memory-Network Processor with Programmable Optimizations" whose inventors are Michael B. Doerr, Carl S. Dobbs, Michael B. Solka, Michael R. Trocino, Kenneth R. Faulkner, Keith M. Bindloss, Sumeer Arya, John Mark Beardslee, and David A. Gibson, is hereby incorporated by reference in its entirety as though fully and completely set forth herein.

TECHNICAL FIELD

This invention relates to multi-processor systems, and more particularly to improvements in processor operation and execution, as well as development of software targeted to such systems.

DESCRIPTION OF THE RELATED ART

A primary objective of a generic hardware system is to achieve application specific (non-programmable) hardware performance while preserving full programmability. Historically, these two concepts are diametric extremes. Application specific hardware is a fixed hardware solution that performs specific functions in the most efficient way possible. This is usually measured in terms of energy per function or energy per operation(s) and in terms of function per (circuit) area which can be related to partial cost of a product. Cost of a chip product is made up of many factors including die area and final package. Cost should also take into consideration the entire ecosystem to develop a product. This ecosystem cost is made up of the time to reduce a specific application to a specific hardware solution, the number of specific hardware solutions required to make up an entire system, and the time it takes to integrate all of the specific hardware solutions through customized communication and memory structures, etc. Thus, a fully integrated solution is required to support all of the numerous specific hardware solutions with their custom interconnect, resulting in a very large area requirement on a single chip die. Historically, this process has resulted in solutions that are non-efficient in area, energy, and time-to-market.

When considering the world of programmability and the concept of targeting hardware, the marketplace or landscape from a hardware architectural and software development style perspective is represented by General Purpose Processors (GPPs) provided by Intel, AMD and ARM; Graphical Processing Units (GPUs) from NVIDIA and AMD; Digital Signal Processors (DSPs) from Texas Instruments and Analog Devices; Field Programmable Gate Arrays (FPGAs) from Xilinx, Altera, etc.; Multi-Core/Many-Core Processors from Cavium and Tilera; and Application Specific Integrated Circuits (ASICs) or System On Chips (SoCs).

GPPs are for general purpose processing, that is, trying to be a jack of all trades, based on very old but proven hardware architecture thinking over more than 40 years. Their mainstream purpose is running user interface (UI) and highly interactive UI intensive applications like MSWord, Excel, email, etc., with a supporting operating system (e.g. Windows and Linux). The hardware characteristics that impact power dissipation are multi-level caches, complex hardware memory management units, large buses, and large clocking structures. In summary, they dissipate a lot of power to perform these tasks. From the perspective of software development, it is considered the easiest software programming model to target. This is from the perspective that the user is developing a single thread that executes consecutively or serially. When parallelism or multiple hardware threads (greater than about four threads) are introduced, the ability to program them efficiently becomes much harder. This is due to the fact that fundamentally the architecture was not developed to support parallel thread operation, and as a result the hardware architecture requires a tremendous amount of overhead complexity to manage. The software programming model requires the introduction of an API or language extensions in order to support the definition of multiple software threads. Although this does not have to be complex, unfortunately current GPP hardware architectures require such complexity.

At a high level, an API that has been extensively used with C, C++, Fortran, etc. for many years in every supercomputer in the world is the MPI (message passing interface) API, an industry standard since the early 1990s. This is a very simple, well understood, API that does not restrict the hardware implementation path. The MPI API allows definition of software threads and communication in a manner that is independent of hardware. This is different from OpenMP, Coarray Fortran, OpenCL, etc. and other language/APIs that inherently dictate an assumed underlying hardware model, which thus restricts interpretation flexibility and causes a forward compatibility issue. In other words, with these latter languages/APIs, the programmer is required to rewrite the program for every new hardware platform targeted.

GPUs were historically developed for processing and targeting the display of data. They are hardware architecturally constrained by their out of core (external) memory model requirements and inner core memory model requirements. The out of core memory requires a GPP to place data in the GPUs memory space. The GPU then pulls in the data, operates on it in a pipeline fashion and then places it back in its external memory space. From here, the data can be sent to a display, or a GPP needs to move the data out of the GPUs memory space to be used/stored further in operation under general processing. Inefficiencies in the hardware are due to (1) the support required to move data around to support out-of-core hardware restrictions and (2) the limited inner-core memory structure, where data is restricted to being processed in streamlined pipelines—similar to deeply pipelined SIMD machines. The result is high power utilization due to hardware inefficiencies to process data. The software programming models used are extremely hardware centric, OpenCL, CUDA, etc. and thus are complex to achieve efficiency and not very portable, with code having to be re-written and re-structured when trying to move to a new hardware target platform.

DSPs can be viewed as a GPP with an instruction set that has been reduced and targeted for generic signal processing. They suffer from the same cache, MMU, and bus woes of their big brother/sister GPP. Additionally, any really high throughput processing function such as Viterbi/Turbo decoding or motion estimation has been reduced to an ASIC accelerator with limited capability, usually only supporting a limited set of specific standards in the commercial marketplace. The programming model is similar to the GPP when targeting a single hardware thread, but because of the signal processing instruction approach in execution unit hardware, to achieve any high efficiency requires hand assembly of functions or use of the DSP company's libraries. When creating a multiple parallel DSP architecture, similar to the parallel GPP discussed above, the problems are further exacerbated.

FPGAs are a completely different hardware approach where the definition of functionality can be done at a bit-level and communication between logical functions is done through programmable wire structures. This hardware approach introduces tremendous overhead and complexity. Due to this, efficient programming is performed in a hardware programming language such as Verilog or VHDL. The compilation process is much more complex due to programmable wiring and programmable logic introducing timing closure hurdles, similar to what is required in an ASIC/SOC but with a structured wire fabric. Power dissipation and performance throughput on specific functions are obviously much better than a GPP or GPU when comparing only one function at a time due to the FPGA only performing exactly what it is programmed for and nothing else. However, if all of the capabilities of the GPP were attempted to be implemented in the FPGA, it would obviously be much worse than the GPP. The difficulty of programming at the hardware level is obvious (for example timing closure). Programming an FPGA really is not "programming," but rather it is logic/hardware design, and VHDL/Verilog are logic/hardware design languages, not programming languages.

Almost all of the multi-core/many-core architectures are, from a hardware perspective, taking a core processor, the cache, MMU, buses, and all associated logic and replicating them on a die with a communication bus/fabric around them. Examples of a multi-core architecture are IBM's Cell, Intel's and AMD's quad and N multi-cores, Cavium's and Tilera's products, a number of custom SoCs, etc. In addition, the power reduction achieved in multi-core architectures is largely insignificant. This fairly obvious result derives from the fact that the multi-core approach merely replicates the GPU approach. The only real power saving in a multi-core architecture is a reduction in some IO drivers which now are not needed since the cores are connected on an added communication bus, whereas before they were on separate die. Thus, the multi-core approach does not result in any less power. Secondly, the software programming model is not improved from the GPP discussed above.

The list of issues identified for the other approaches is why, for specific markets, it is often viewed that the only way to achieve performance efficiency and cost goals is to develop a custom chip that has specific GPPs, DSPs, and ASIC accelerators to form an SoC. The SoC provides programmability where needed and ASIC performance for specific functions to balance power dissipation and cost. However, now the software programming model is even more complex than discussed under the above programmable hardware solutions. In addition, SoCs may result in a loss of flexibility associated with a fully programmable solution.

Common among all of these programmable hardware solutions is that the software programming models represented today in the marketplace are focused on extrapolating the execution model and underlying hardware architecture to more efficiently support it's targeting. The focus on extrapolating up features of the execution model to the software programming model can be observed in looking at key characteristics of some of the more popular parallel programming languages. A few examples representing approaches in use today are OpenMP, OpenCL, and MPI.

OpenMP (Open Multi-Processing) is an industry standard API that supports shared memory multiprocessing programming. OpenMP comprises a set of compiler directives, library routines, and environment variables that influence run-time behavior. It supports multithreading through a method of parallelizing whereby a master thread (a series of instructions executed consecutively) forks a specified number of slave threads and a task is divided among them. The threads then run concurrently, with the runtime environment allocating threads to different resources or processors depending on usage, machine load and other factors. The number of threads can be assigned by the runtime environment based on environment variables or in code using functions. The section of code that is meant to run in parallel is marked accordingly, with a preprocessor directive that will cause the threads to form before the section is executed. In C/C++ this is through the use of #pragmas. By default, each thread executes the parallelized section of code independently. Both task parallelism and data parallelism can be achieved. After the execution of the parallelized code, the threads join back into the master thread, which continues onward to the end of the program. To support inter thread communication, extensions of OpenMP could be used or another different industry standard API such as MPI (Message Passing Interface).

The Open Computing language (OpenCL) is a framework for writing programs with the objective to enable execution across heterogeneous platforms comprising central processing units (CPUs), graphics processing units (GPUs), digital signal processors (DSPs), field-programmable gate arrays (FPGAs) and other processors. It is designed to support close-to-hardware interface with limited abstraction. Because of this, OpenCL based programs generally require advanced knowledge of underlying hardware to achieve acceptable performance. OpenCL programs also require refactoring when retargeting to a different hardware architecture.

OpenCL supports writing of kernels using the ANSI C programming language with some limitations and additions. It does not allow the use of function pointers, recursion, bit fields, variable-length arrays, and standard header files. The language is extended to support parallelism with vector types and operations, synchronization, and functions to work with work-items/groups. An application programming interface (API) is used to define and then control the platform. OpenCL, at a course-level, supports parallel computing using task-based and data-based parallelism.

The Message Passing Interface (MPI) is a standardized language-independent, scalable, and portable message-passing communications protocol API. The MPI API is meant to provide essential virtual topology, synchronization, and communication functionality between a set of processes (that have been mapped to nodes/servers/computer instances) in a language-independent way, with language-specific syntax (bindings). The MPI API standard defines the syntax and semantics of a core of library routines that include support for, but are not limited to, various behavior definable point-to-point and collective/broadcast communication send/receive operations and synchronizing of processes. MPI remains the dominant model used in high-performance computing today.

Other approaches to development of software applications for parallel execution on multiprocessor systems generally require tradeoffs between ease of development and efficiency of parallel execution. In other words, it has generally been the case that the easier the development process for the programmer, the more inefficiently the resulting executable program executes concurrently on hardware; and conversely, more efficient parallel execution has generally required significantly more effort by programmers, i.e., to design programs in greater detail to avoid inefficient processing and to use efficiency enhancing features of the target hardware.

Therefore, improved systems and methods are desired for facilitating the software description of the application or system level view to drive the software programming model and its subsequent use to target the execution model and underlying hardware architecture. Improvements are also desired which provide mechanisms that enable efficient programmable implementation of applications through this process.

SUMMARY OF THE EMBODIMENTS

Various embodiments for preparing application software for a multi-processor array are disclosed. The multi-processor array may comprise a plurality of processors (e.g., in a 2D or 3D grid) and a plurality of memories and routing elements interspersed among the processors. A routing fabric may be provided to connect the various processors and memories using the routing elements.

A front-end compilation may be performed using application source code to generate a plurality of intermediate representations and connectivity information. A particular intermediate representation of the plurality of intermediate representations may correspond to a particular task of a plurality of tasks, wherein the connectivity information includes a plurality of connections, and wherein a particular connection specifies a communication between a first task of the plurality of tasks and a second task of the plurality of tasks. Logical objects included in the application source code may be mapped to physical resources included in the multi-processor array using the plurality of intermediate representations and the connectivity information to generate a resource map. A respective implementation for each connection in the plurality of connections may then be selected, and a first optimization operation may be performed using the plurality of intermediate representations to generate a plurality of optimized intermediate representations. Executable code may be generated using the plurality of optimized intermediate representations. The executable code may then be simulated to generate a simulation result and the executable code may be loaded onto the multi-processor array.

In a non-limiting embodiment, the application source code may be parsed to generate an initial intermediate representation and at least one second optimization operation may be performed using the initial intermediate representation to generate the plurality of intermediate representations. Using the plurality of intermediate representations, connectivity between the plurality of tasks to generate the plurality of connections may be determined, and the plurality of intermediate representations and connectivity information may be stored in a project database. The multi-processor array may include a plurality of processors as well as memories interspersed among the processors. In mapping the logical objects, a particular task of the plurality of tasks may be assigned to the particular processor of the plurality of processors, and a variable associated with the particular task may be assigned to a respective data memory associated with (e.g., physically proximate to) the particular processor.

Figure 1:
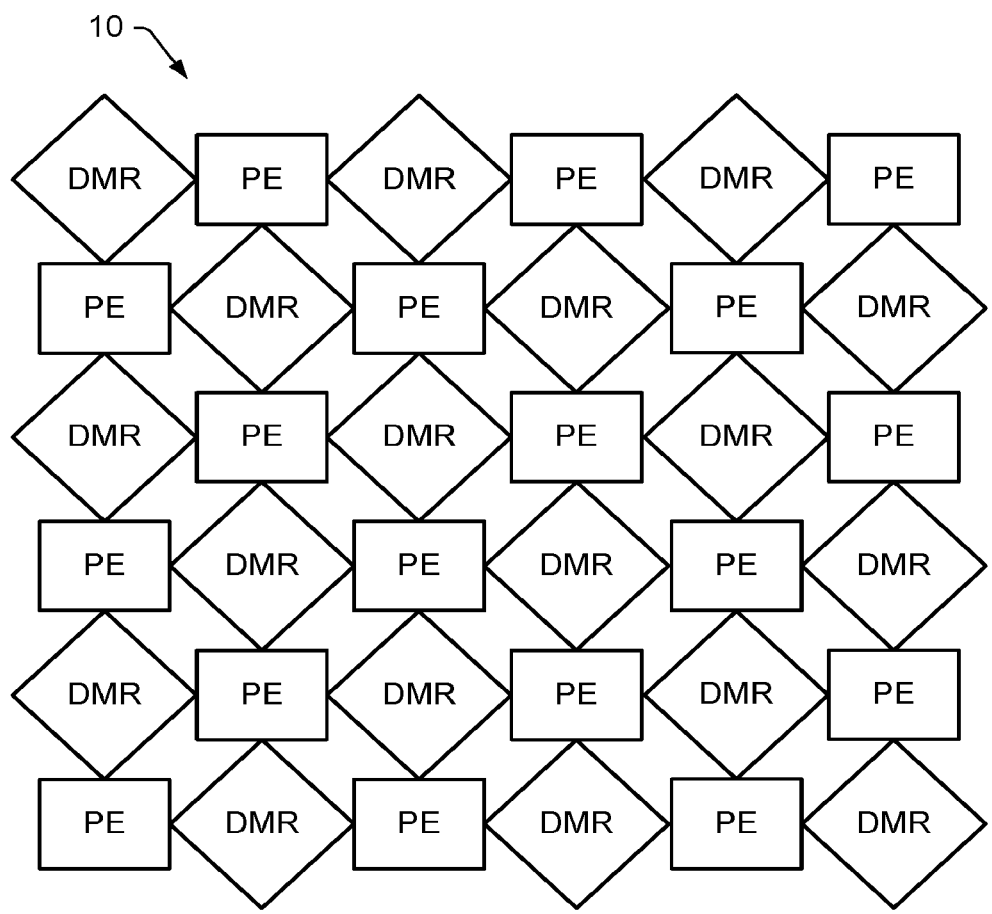
FIG. 1 is a block diagram illustrating one embodiment of a multi-processor system (MPS).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

Terms

Computer System—The term "computer system" refers to any of various types of computing or processing systems, including a personal computer system (PC), mainframe computer system, workstation, network appliance, internet appliance, personal digital assistant (PDA), grid computing system, or other device or combinations of devices. In general, the term "computer system" can be broadly defined to encompass any device (or combination of devices) having at least one processor that executes instructions from a memory medium.

Software Application—The term "software application" (also referred to herein as just an "application") is intended to have the full breadth of its ordinary meaning, and includes any type of program instructions, code, script and/or data, or combinations thereof, that may be stored in one or more memories and executed by one or more processors. Exemplary software applications include programs written in text-based programming languages, such as C, C++, FORTRAN, Java', assembly language, etc.; graphical programs (programs written in graphical programming languages); assembly language programs; programs that have been compiled to machine language; scripts; and other types of executable software. In general a program is a set of instructions that specify one or more data structures and that specify the procedural steps to take with regard to data in those structures to perform one or more functions. A program is often targeted for specific machine architecture. More abstractly, the procedural steps of a program may be referred to as its algorithm.

An application may execute on one or more processors of a multi-processor system (MPS) and may read data from and/or write data to one or more of the local memories of the MPS. An application may include one or more computational tasks (or simply "tasks"), where each task typically runs on a single processor of the MPS and may share the processor with one or more tasks from one or more applications. The application may perform a particular function or operation. If the application includes more than one task, the tasks may communicate with each other to perform the function or operation.

The MPS may simultaneously execute a plurality of applications, e.g., where the applications execute in parallel with each other. The applications may communicate with each other, and the respective functions or operations performed by the applications may build upon each other to perform a larger or higher-level function or operation.

Software Programming Model—The Software Programming Model, simply stated, is the user's view of the machine and its operating environment. The Software Programming Model includes the language (or languages) that an application can be written in as well as the libraries that provide abstracted, encapsulated functionality beyond that expressed directly in the language(s). The Software Programming Model also includes the mechanisms through which an application interacts with entities outside of itself (I/O, extended memory, etc.) and through which meta-information (e.g., performance constraints or requirements) about the application is expressed. Two primary parts of the Programming Model are the Control Model, which represents how parallelism is expressed in or derived from the application, and the Communication Model, which represents how the parallel entities of the application share information.

The Software Programming Model presents an "idealized" view of the actual control and data flow and communications that will occur when the application is ultimately executed. The semantics of the operations are "as if" the underlying implementation performed exactly as described in the Software Programming Model; the actual steps undertaken are not important as long as the same effects (answers) are obtained. The actual implementation steps may differ for reasons of efficiency in code and/or data size, speed, power consumption, etc.

An important consideration of the Software Programming Model is that it simultaneously provides the user with mechanisms that support the expression of the application (and its operation) in terms that are convenient, natural, and intuitive for the user while also capturing information sufficient to support the correct and efficient processing of the application through the toolset (compiler, etc.) and then under the Execution Model.

Hardware Programming/Execution Model—The Hardware Programming Model or Execution Model represents how an application is executed. It defines how the set of information that corresponds to an application's logic and data objects is expressed and how that information is processed over time to accomplish the function specified by the application. The purpose of the system tools (compiler, parallelism extractor, place-and-route, etc.) is to convert the application from its Software Programming Model expression into the corresponding Execution Model expression. The Execution Model includes the mechanisms required to support the functionality described by the Software Programming Model (e.g., through libraries) as well as monitor, mediate, and manage the use of the hardware (e.g., through an O/S).

The Execution Model may correspond quite closely to the Software Programming Model or it may be quite different; different aspects of the Software Programming Model may have different degrees of direct correspondence to the Execution Model. The level of correspondence is related to how closely the Underlying Hardware Architecture resembles the original (Software) Programming Model. The closer the resemblance, the higher the correspondence.

Underlying Hardware Architecture—The Underlying Hardware Architecture is the architecture of the physical device on which the computation executes. At this level, all operations directly correspond to physical operations carried out by the device. The level of abstraction at which the Underlying Hardware Architecture may be described can vary from a high-level conceptual architecture (useful for evaluation, simulation, characterization, and trade-off analysis during design-space exploration) to a low-level implementation architecture (useful for driving the physical design of a device to be fabricated). Even at the implementation level, different instances of the Underlying Hardware Architecture may vary in capability or capacity. For example, one instance may implement a 10×10 grid of processing units while another may implement only a 6×6 grid. While different in capacity, each remains consistent with the Underlying Hardware Architecture.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Processing Element (PE)—a single programmable core in a multi-core processor.

Data Memory—memory used to store data that is used by one or more PEs.

I/O Port—a connection into or out of a computer processor from off-chip.

Route—a physical connection between two data memories that can be used to transfer data between the two memories.

Direct Memory Access (DMA)—A method for transferring data between two data memories using a route. A DMA access does not transfer data through a PE.

Shared Memory—data stored in data memory that is accessible by two or more tasks.

Task—A computational unit composed of application source code to implement a specific function. A task is assigned to one or more PEs on a multi-core processor.

Variable—a storage location paired with a symbolic name. Variables are referenced in a task and are assigned to location(s) in a data memory that is accessible by the task.

Input/Output (IO)—Data read from off-chip or written off-chip through an IO port.

Communication (Comm)—an abstract connection between a task or IO and two or more other tasks that is used to transfer data. A comm can be implemented using a route, shared memory, or any other available physical resource.

Communication API—A set of routines and protocols such as MPI (Message Passing Interface) used to transfer data between tasks or between I/O and tasks.

Resource Mapping—the process of assigning abstract objects (tasks, variables, comms, I/Os, etc.) to physical resources on a processor chip. All resources may be mapped manually, automatically, or a combination of the two.

Task Mapping—the Resource Mapping step that assigns tasks to PEs and IO to IO ports.

Variable Allocation—the Resource Mapping step that maps variables to a data memory and allocates address space in the data memory for the variable.

Comm Mapping—the Resource Mapping step that assigns communications to physical resources such as shared memory or routes.

Intermediate Representation (IR)—the data structure used internally by a compiler to represent source code. The IR is conducive to further processing, such as optimization and translation.

Turning to FIG. 1 a block diagram illustrating one embodiment of a multi-processor system (MPS) is depicted. In the illustrated embodiment, MPS 10 includes a plurality of processing elements (PEs) and a plurality of data memory routers (DMRs), which may also be referred to as dynamically configurable communicators, or dynamically configurable communication elements, coupled to communicate data and instructions with each other. As used herein, a PE may also be referred to as a PE node, and a DMR may also be referred to as a DMR node.

The processing system (MPS) 10 may be used in any of various systems and applications where GPMCs, DSPs, FPGAs, or ASICs are currently used. Thus, for example, the processing system 10 may be used in any of various types of computer systems or other devices that require computation. In one contemplated embodiment, the processing system 10 is used as a signal processing device in a digital video display system.

In one embodiment, a PE may include one or more arithmetic-logic units (ALUs) configured for manipulating data, one or more instruction processing units (IPUs) configured for controlling the ALUs, one or more memories configured to hold instructions or data, and multiplexers and decoders of various sorts. Such an embodiment may include a number of ports ("processor ports"), some of which may be configured for connection to DMRs and others that may be configured for connection to other PEs.

In one embodiment, a DMR may include one or more random access memories (RAMs) configured to hold data and instructions, a configurable controller, a network switch such as a crossbar switch, registers, and multiplexers. Such an embodiment may include a plurality of ports, some of which may be configured for connection to PEs (referred to herein as PE-type ports) and others that may be configured to connect to DMRs (referred to herein as DMR-type ports). It is noted that for any given port, whether configured for connection to or from a DMR or PE, the amount of data transferable through such a given port in a particular clock cycle may vary in various embodiments. For example, in one embodiment, a given port may be configured to transfer one word of data per clock cycle, whereas in another embodiment a given port may be configured to transfer multiple words of data per clock cycle. In yet another embodiment, a given port may employ a technique such as time-division multiplexing to transfer one word of data over multiple clock cycles, thereby reducing the number of physical connections comprising the port.

In one embodiment of MPS 10, each PE may include a small local memory reserved for instructions and may include very little local data storage. In such an embodiment, DMRs neighboring each PE may be configured to provide operands to a given PE. In a particular embodiment, for many PE instructions a given PE may read operands from neighboring DMRs, execute an ALU operation, and store an ALU result to a given neighboring DMR in one clock cycle. An ALU result from one PE may thereby be made available to several other PEs in the clock cycle immediately following execution. Producing results in this fashion may enable the execution of neighboring PEs to be closely coordinated or "tightly coupled."

As used herein, from the perspective of a given DMR or PE, a neighboring DMR or PE refers to a DMR or PE that can be accessed from the given DMR or PE within a particular latency. In some embodiments, the latency defining the extent of a neighboring relationship may vary depending on factors such as clock speed, for example. Further, in some embodiments, multiple degrees of neighboring may be defined, which degrees may correspond to different access latencies. For example, in one embodiment, a "nearest neighbor" may be defined as a device that can supply data during the same clock cycle during which it is requested, a "next-nearest neighbor" may be defined as a device that can supply data within one clock cycle after it is requested, and so forth. In other embodiments, it is contemplated that other metrics may be used to quantify a neighboring relation.

In a given MPS embodiment, some DMRs and PEs may be logically adjacent to other DMRs and PEs. As used herein, "logically adjacent" refers to a relation between two devices, such as one DMR and another DMR, or one DMR and one PE, such that one or more ports of one device are directly connected to respective ports of the other device without passing through an intervening DMR or PE. Further, in a given MPS embodiment, some DMRs and PEs may be physically adjacent to other DMRs and PEs. As used herein, "physically adjacent" refers to a relation between two devices, such as one DMR and another DMR, or one DMR and one PE, such that no other DMR or PE is physically located between the two devices.

In some MPS embodiments, devices such as DMRs and PEs that are logically and/or physically adjacent are also neighboring or neighbor devices. However, it is noted that in some embodiments, logical and/or physical adjacency between given devices does not entail a neighboring relation, or a particular degree of neighboring relation, between the given devices. For example, in one embodiment one DMR may be directly connected to another DMR that is located a considerable distance away. Such a pair may be logically adjacent but not physically adjacent, and the signal propagation time from the one DMR to the other may be too great to satisfy the latency requirement of neighbors. Similarly, in one embodiment one DMR may be physically adjacent to another DMR but not directly connected to it, and therefore not logically adjacent to it. Access from the one DMR to the other DMR may traverse one or more intermediate nodes, and the resulting transit delay may be too great to satisfy the latency requirement of neighbors.

Depending on the technology and implementation of a given embodiment of MPS 10, the specific number of the DMR's plurality of ports as well as the size of the DMR memory may be balanced against the overall desired execution speed and size of the DMR. For example, one DMR embodiment may include 4 PE-type ports, 4 DMR-type ports, and 4 K words of memory. Such a DMR embodiment may be configured to provide a direct memory access (DMA) mechanism. A DMA mechanism may allow a given DMR to copy data efficiently to or from other DMRs, or to or from locations external to MPS 10, while PEs are computing results.

In one embodiment of MPS 10, data and instructions may be transferred among the DMRs in one of several different ways. A serial bus may be provided to all memories in MPS 10; such a bus may be used to initialize MPS 10 from external memory or to support testing of MPS data structures. For short-distance transfers, a given PE may be programmed to directly move data to or from its neighbor DMRs. To transfer data or instructions over longer distances, communication pathways may be dynamically created and destroyed in the network of DMRs.

For the purpose of such longer-distance data transfer, a network of interconnected DMRs within MPS 10 may constitute a switched routing fabric (SRF) for communication pathways. In such an embodiment, there may be at least two methods for managing communication pathways in the SRF. A first method is by global programming, wherein paths may be selected by software control (for example, either by a human programmer or by a compiler with a routing capability) and instructions may be coded into DMR configuration controllers to program the crossbar appropriately. To create a pathway, every DMR along the pathway may be explicitly programmed with a particular routing function. In a dynamic environment where pathways are frequently created and destroyed, a large number of crossbar configuration codes may be required, storage of which may in turn consume potentially limited DMR RAM resources.

A second method for managing communication pathways is referred to as "wormhole routing". To implement wormhole routing, each DMR may include a set of steering functions and a mechanism to stop and restart the progress of a sequence of words, referred to as a message, through the SRF. Because the steering functions may be commonly used and re-used by all communication pathways, the amount of configuration code that may occupy DMR RAM may be much smaller than for the global programming method described above. For the wormhole routing method, software control may still be used to select the particular links to be used by a pathway, but the processes of pathway creation (also referred to herein as set up) and destruction/link release (also referred to herein as teardown) may be implemented in hardware with minimal software intervention.

To prevent potential loss of data words on a pathway, an embodiment of MPS 10 may implement flow control between receivers and transmitters along the pathway. Flow control refers to a mechanism that may stop a transmitter if its corresponding receiver can no longer receive data, and may restart a transmitter when its corresponding receiver becomes ready to receive data. Because stopping and restarting the flow of data on a pathway has many similarities to stopping and restarting the progress of a message in wormhole routing, the two may be combined in an integrated scheme.

In one embodiment, MPS 10 may include pluralities of PEs and DMRs, which PEs may be identical and which DMRs may be identical, connected together in a uniform array. In a uniform array, the majority of PEs may be identical and each of a majority of PEs may have the same number of connections to DMRs. Also, in a uniform array, the majority of DMRs may be identical and each of a majority of DMRs may have the same number of connections to other DMRs and to PEs. The PEs and DMRs in one MPS embodiment may be interspersed in a substantially homogeneous fashion. As used herein, a substantially homogeneous interspersion refers to an arrangement in which the ratio of PEs to DMRs is consistent across a majority of sub-regions of an array.

A uniform array arranged in a substantially homogeneous fashion may have certain advantageous characteristics, such as providing a predictable interconnection pattern and enabling software modules to be re-used across the array. In one embodiment, a uniform array may enable a small number of instances of PEs and DMRs to be designed and tested. A system may then be assembled by fabricating a unit comprising a DMR and a PE and then repeating or "tiling" such a unit multiple times. Such an approach may lower design and test costs through reuse of common system elements.

It is also noted that the configurable nature of the PE and DMR may allow a great variety of non-uniform behavior to be programmed to occur on a physically uniform array. However, in an alternative embodiment, MPS 10 may also be formed with non-uniform DMR and PE units, which may be connected in a regular or irregular array, or even in a random way. In one embodiment, PE and DMR interconnections may be implemented as circuit traces, for example on an integrated circuit (IC), ceramic substrate, or printed circuit board (PCB). However, in alternative embodiments, such interconnections may be any of a variety of miniature communication links, such as waveguides for electromagnetic energy (i.e., radio or optical energy), wireless (i.e., unguided) energy, particles (such as electron beams), or potentials on molecules, for example.

The MPS 10 may be implemented on a single integrated circuit. In one embodiment, a plurality of MPS integrated circuits may be combined to produce a larger system. A given embodiment of MPS 10 may be implemented using silicon integrated circuit (Si-ICs) technology, and may employ various features to account for specific characteristics of such a technology. For example, the circuits on a Si-IC chip may be confined to a thin plane. Correspondingly, a given embodiment of MPS 10 may employ a two-dimensional array of PEs and DMRs such as that illustrated in FIG. 2. However, alternative MPS embodiments are contemplated that include different arrangements of PEs and DMRs.

Further, the available wiring density on a Si-IC chip may be much higher than between such chips, and each chip may have a perimeter of special Input/Output (I/O) circuits to interface on-chip signals and off-chip signals. Correspondingly, a given embodiment of MPS 10 may employ a slightly non-uniform array composed of a uniform array of PEs and DMRs in core of the chip, and modified PE/DMR units along the perimeter of the chip. However, alternative MPS embodiments are contemplated that include different arrangements and combinations of uniform and modified PE/DMR units.

Also, computational operations performed by Si-IC circuits may produce heat, which may be removed by IC packaging. Increased IC packaging may require additional space, and interconnections through and around IC packaging may incur delays that are proportional to path length. Therefore, as noted above, very large MPSs may be constructed by interconnecting multiple chips. Programming of such multiple-chip MPS embodiments may take into account that inter-chip signal delays are much longer than intra-chip delays.

In a given Si-IC MPS 10 embodiment, the maximum number of PEs and DMRs that may be implemented on a single chip may be determined by the miniaturization possible with a given Si-IC technology and the complexity of each PE and DMR. In such an MPS embodiment, the circuit complexity of PEs and DMRs may be minimized subject to achieving a target level of computational throughput. Such minimized PEs and DMRs may be referred to herein as being streamlined. In one MPS 10 embodiment, the target level of throughput for a PE may be comparable to that of the arithmetic execution units of the best digital signal processors (DSPs) made in the same Si-IC technology. However, other MPS embodiments are contemplated in which alternative references for target PE throughput may be used.

In some embodiments, MPS 10 may employ the best features of DSP and FPGA architectures. Like a DSP, MPS 10 may be a programmable chip with multiple processing units and on-chip memory. However, relative to a DSP, the MPS processing units may be streamlined, there may be more of them, and they may be interconnected in a novel way to maximize the bandwidth of data movement between them as well as data movement on and off the chip. Having more processing units than a DSP may allow MPS 10 to do more multiplications per unit time, and streamlined processing units may minimize energy use. Many DSPs with internal parallelism may be bus-oriented architectures. In some embodiments, MPS 10 may not include a bus, but rather may include neighboring shared local memories, such as in a DMR, embedded in an SRF that may provide significantly higher total bandwidth than a bus-oriented architecture.

Compared to the FPGA approach, some MPS embodiments may be more coarsely grained. For example, in one MPS embodiment, operations may have a natural word length (e.g., 16-bits) and computation may be most efficient if performed using data that is a multiple of the natural word length. In some MPS embodiments, PEs and DMRs may be denser than the equivalent structures realized in FPGA, which may result in shorter average wiring length, lower wiring capacitance and less energy use. In contrast to an FPGA implementation, in some MPS embodiments, every ALU in the MPS may be part of a processor (i.e., a PE), which may facilitate the fetch of operands and the write back of results to surrounding fast memory in the DMRs. Timing and clock skew issues for ALU, fetch, and write back operations may be solved once during the design of the IC chip and need not be re-solved with each new application as is typical of FPGA implementations.

Coarse-grained programmable embedded systems may consist of a small number of processors or digital signal processing engines. For example, a device may contain four or eight processor cores as well as fixed or programmable application-specific logical functions. These systems usually have a large common memory that is used to store data and instructions. Typically, they utilize virtual memory schemes to extend the range of data and instruction memories that can be addressed to be greater than the size of the on-chip memory. Such a system has no Communication Mapping requirements and minimal physical characteristics to consider during code generation.

Figure 2:
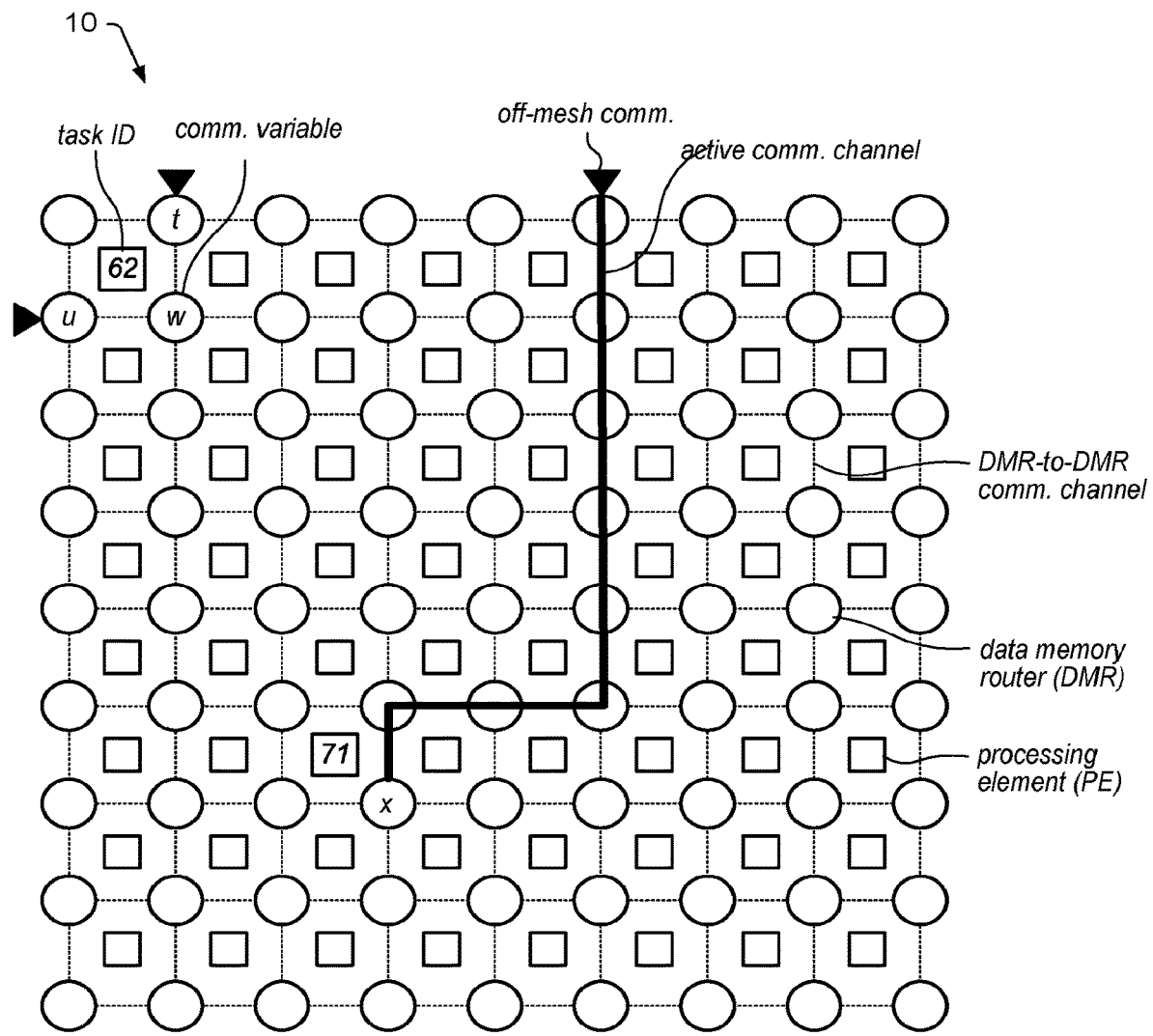
FIG. 2 illustrates an example MPS composed of processing element uniformly interspersed with data memory routers.

FIG. 2 illustrates an example MPS composed of an 8×8 array of PE (squares) uniformly interspersed with a 9×9 array of DMR (circles). Programs may be compiled into tasks that are assigned to PE. The first example program has been compiled with taskID=62, and assigned to a specific PE in the upper left corner of the array. The variables u, v, w are declared communication variables in the program source code, and assigned to specific memory addresses in the adjacent DMRs; u and v are buffers for the I/O ports, and w is a buffer for on-chip network communications with its associated DMR. The second example program has been compiled with taskID=71, and assigned to a specific PE in the interior of the array. The variable x is a declared communication variable and assigned to the DMR shown. A communication pathway associated with variable x runs from its assigned DMR via other DMR to an I/O port at the top row. As shown, the two example programs do not communicate with each other, but they can easily be made to communicate by addition of another communication variable to the task 71, and a pathway between its DMR and variable w in the DMR adjacent to task 62.

Figure 3:
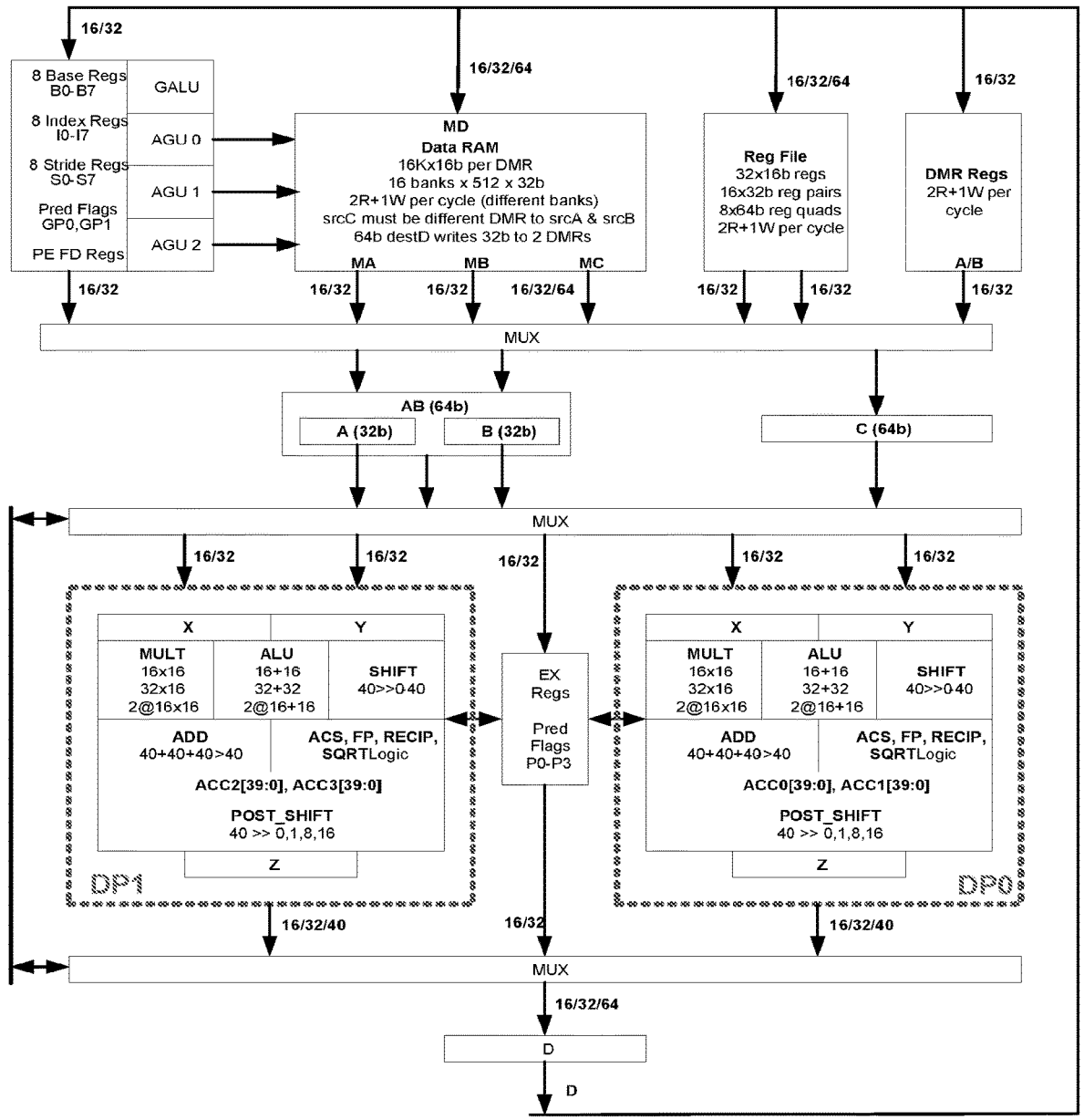
FIG. 3 is a block diagram illustrating an embodiment of a data path included in a dynamically configurable processing element.

FIG. 3 shows a data path example with dual high throughput operational units designated data pipeline 0 (DP0) and data pipeline 1 (DP1) with the expansion of some additional flow registers for this discussion. These are the extra pipeline registers X, Y for input and Z for output. Also shown are the nominal operand stages A, B, C and the destination stage D.

The A, B, and C registers are used to store operands up to 64 bits wide as previously discussed as being available. The HyperOps uses the muxing between the A, B, and C registers and the X and Y registers of the two datapaths to control the operands and the word alignments required for each operation performed by the datapath. The operand fetching into the A, B, and C registers during HyperOp processing is under program control with shifting options to allow for address-aligned accesses to memory and for proper operand alignment for the datapath math units. This innovation allows for the simpler, low-power memory structure and addressing modes so as to provide a manner in which to feed sufficient operands to the complex datapath/HyperOp combination to provide peak throughput independent of how the operands are stored in memory.

Similar to the operand discussion is the one for results. The datapath results are put into either of the accumulators or the Z register during HyperOp execution. These can then be either moved to D for writeback elsewhere or fed back on the illustrated path to be used as additional operands in subsequent instructions. As with the operands, re-alignment of the results can occur here to provide for aligned write-backs to memory/registers for un-aligned data. Again these operations are independently controlled by the HyperOp instructions.

In many architectures, an accumulator for adding together long strings of similar math operations into a single sum there is a single accumulator is supported. In addition, sometimes all operations modify this accumulator with the results (again, our previous generation). While this structure works fine for architectures that are primarily single, scalar operations per cycle, with the addition of an extra datapath and the ability to operate on multiple operands per cycle with HyperOps it becomes necessary to extend this concept. The current design point contains two independent accumulators per datapath. Each operation can choose which, if any, accumulator will be updated. These can therefore be used to either store intermediate values for later processing through the muxing structure previously discussed or to allow for multiple data streams to be processed in an interleaved form without the additional cycle or power overhead of saving and restoring the accumulator values. These features of the dual accumulator structure when coupled with the other features such as dual datapaths and operand/result alignment provide a mechanism to keep the pipeline more fully utilized, which in turn reduces the overall power per operation for the design.

Another feature related to the accumulators provides another way to speed up inner loops of some algorithms and increase parallel execution across multiple PEs in a chip. For example, this is needed in order to minimize the overhead on computational loops that should be spread across multiple PEs in order to provide enough data processing bandwidth, as in a multi-tap high-bandwidth FIR filter.

In FIG. 3, the address generator section containing the address generation units (AGUs) was shown but not detailed. The address generator section of the PE architecture generates addresses for the various addressing modes supported by the hardware. Its unique features will be described further in this section.

The address generator section may have multiple programmable math units for use for generation of addresses. Each of these units is an Address Generation Unit (AGU). In addition, there may be one or more extended math and logical unit (GALU) that can be used for doing additional computations in the address computation portion of the pipeline. These calculations are useful for extending the functionality and performance of the pipe and for removing pipeline delays in table lookup type operations as well as others. In FIG. 3 the example Address Generator section contains three AGU and one GALU and a set of support registers.

For typical operations in a standard encoding method, the AGUs are used to generate addresses for either two source operands and a destination, or for a subset of these and some address or extended math operation. The units are coupled tightly with the encoding. For extended operations via the HyperOp encodings, these units are more decoupled and can be independently controlled by the instruction stream. This allows for more flexibility and more parallelization of operations. The optimizations may be performed at compile time so that real-time reordering is not required and thus there is no operating power penalty of such optimizations.

Figure 4:
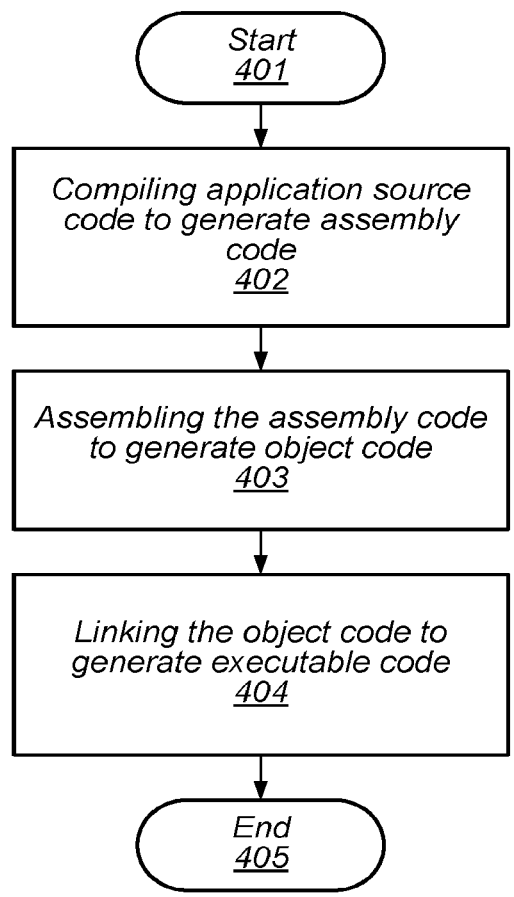
FIG. 4 is a flow diagram depicting an embodiment of a compilation flow.

A typical programming design flow is shown in FIG. 4. The user source code is translated via the compiler and assembler into one or more object files that are then linked together to form an executable file containing a binary code image that is interpretable by the target processor cores. To run and test the executable image, a loader program copies it either to a simulator or to the target cores' instruction memories of a physical embedded system.

For the typical flow of FIG. 4, all compiler optimizations are completed prior to the assembler and linker phases. This is even the case for multi-threaded application programs that allow individual threads to run on different cores.

Figure 5:
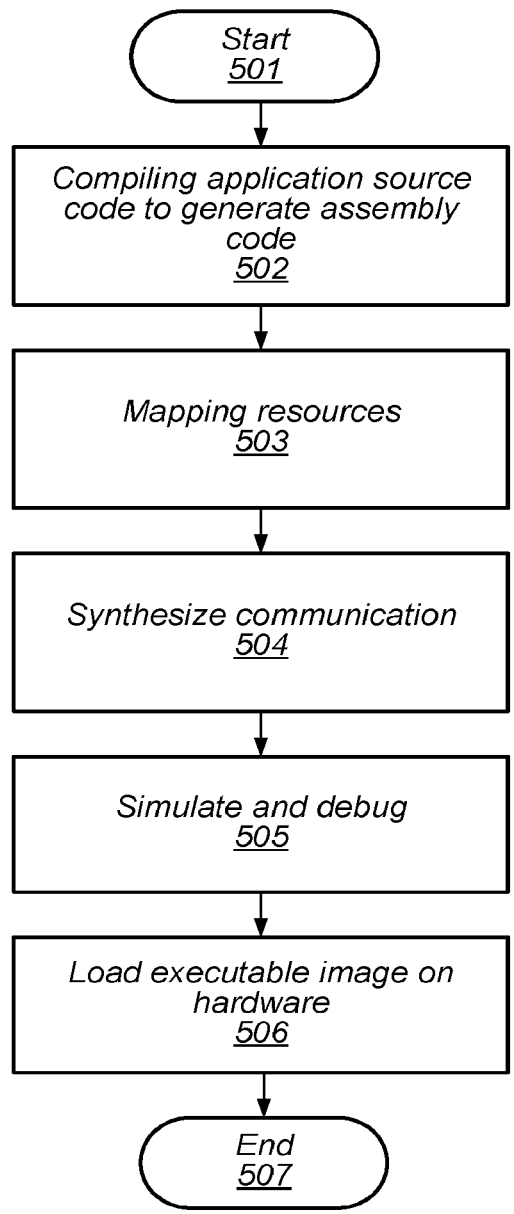
FIG. 5 is a flow diagram depicting an embodiment of a multi-task compilation flow.

A multi-core processor with many PEs and smaller distributed memories has the benefit of lower power consumption, but has more physical constraints to consider. A typical tool flow for such a processor is shown in FIG. 5. In this tool flow, which begins in block 501, the user source code consists of one or more tasks that communicate with each other via a communication-enabling application programming interface (API). APIs may be designed to support a message passing paradigm, for example.

The method includes compiling application source code to generate assembly code (block 502). The compilation phase runs a C compiler, an assembler, and a task linker to generate object files for each task and then it extracts the connectivity between the tasks into a connectivity database. At this point, all compiler optimizations are completed, but the tasks, variables and communications have not been mapped to physical resources yet.

The method includes mapping resources (block 503). Task Mapping, Variable Allocation, and Communication Mapping are done during Resource Mapping. Additionally, the method includes synthesizing communication (block 504). Such code synthesis for communication APIs may be performed as part of a Final Linker phase of the compilation The method also includes simulating and debugging (block 505). An image file may be loaded into a software simulation or hardware debugger for such test and debug. The method further includes loading an executable image on hardware (block 506). Such loading may be part of deploying the compiled software for use on a multi-processor array.

Since the compiler data used for optimizations is gone after completion of the compilation process, little or no optimizations are possible after the physical resources are assigned in Resource Mapping. Iteration of steps in the flow is not supported.

Figure 6:
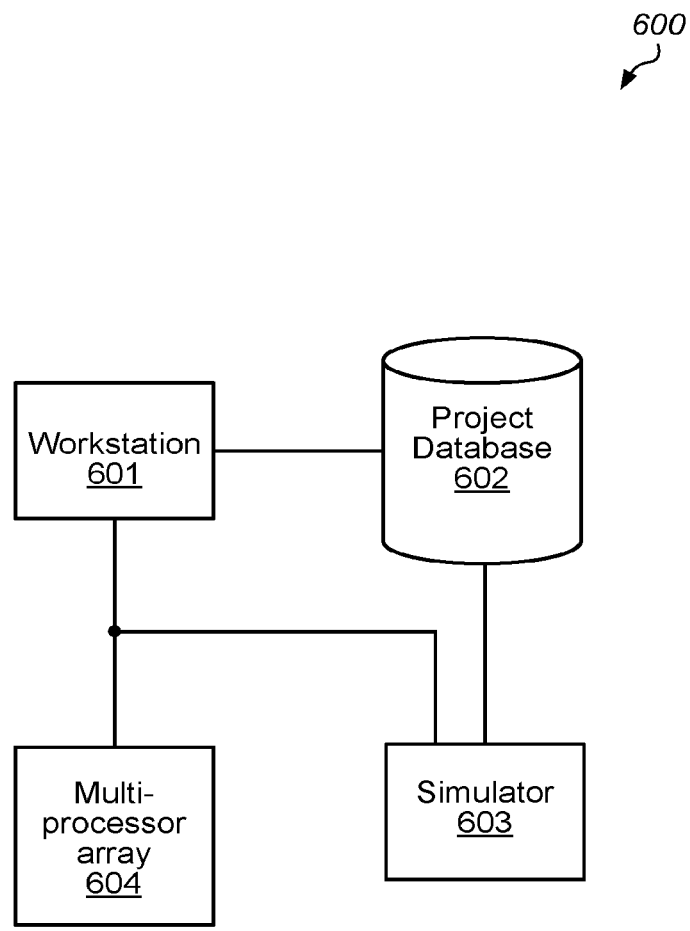
FIG. 6 is a block diagram depicting an embodiment of a multi-processor compilation with optimization.

A way to achieve optimal results with a distributed memory, multi-core processor, is to create a tools flow that maintains sufficient information throughout the flow to allow compiler optimizations to be done at the end—after all resources have been fully mapped. This includes all forms of compiler optimizations as well as load balancing optimizations such as multi-tasking. In multi-tasking, multiple tasks are assigned to the same PE. To be generally useful and practical the tasks selected for each PE may be selected to operate together without incurring the overhead of a context switch (wherein registers and variables are saved so that they may be restored at some later time). A block diagram of computer system that can execute such a flow is illustrated in FIG. 6.

As illustrated, computer system 600 includes workstation 601, project database 602, simulator 603, and multi-processor array 604. In various embodiments, workstation 601 may include a computer, laptop computer, tablet or any other suitable computing device capable of communication with project database 602, multi-processor array 604, and simulator 603 via either a wired or wireless network.

Project database 602 may include application source code, as well as files generated during the compilation process such as intermediate representations and image files. In various embodiments, project database 602 may be stored on a disk server or other suitable storage device connected to the other components illustrated in computer system 600.

In various embodiments, multi-processor array 604 may include multiple processing elements (PEs) as well as other components. For example, as described above, multi-processor array 604 may include one or more data memory routers as illustrated in the embodiment depicted in FIG. 1.

Simulator 603 may include any suitable combination of software and hardware configured to execute a compiled version of application source code. For example, simulator 603 may be a dedicated computer or workstation executing software to emulate a desired environment in which the application will ultimately be executed. In some cases, simulator 603 may be configured to provide test data to the application software being simulated and gather results, such as, variable values, generated by application software operating on the test data.

Figure 7:
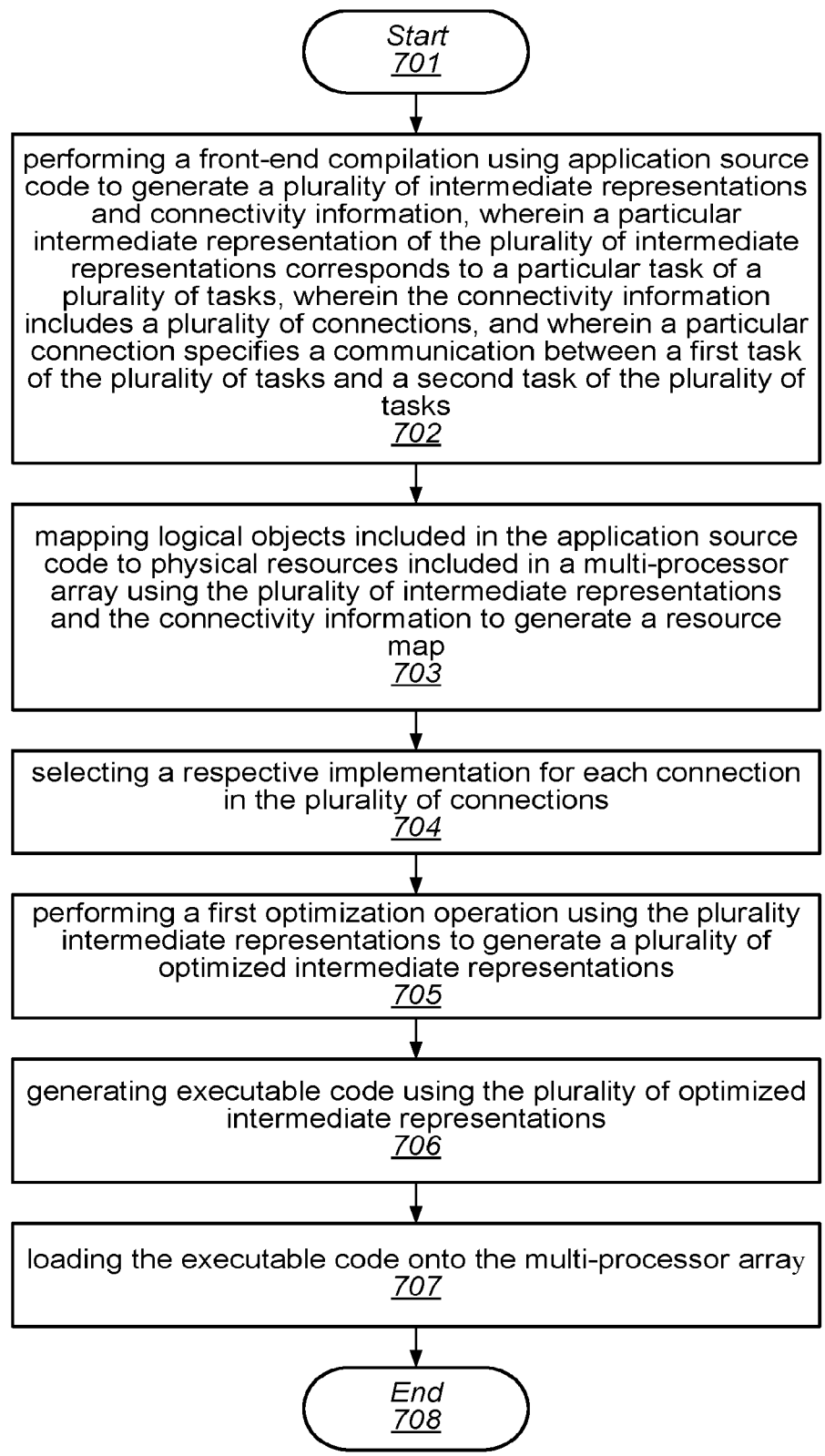
FIG. 7 is a flow diagram depicting an embodiment of a multi-processor compilation flow.

Turning to FIG. 7, a flow diagram depicting an embodiment of a method for compiling application source code is illustrated. The method, which begins in block 701, may be applied to the computer system illustrated in FIG. 6.

The method includes performing a front-end compilation using application source code to generate a plurality of intermediate representations and connectivity information, wherein a particular intermediate representation of the plurality of intermediate representations corresponds to a particular task of a plurality of tasks, wherein the connectivity information includes a plurality of connections, and wherein a particular connection specifies a communication between a first task of the plurality of tasks and a second task of the plurality of tasks (block 702). As used and described herein, connectivity information is information describing an abstract connection between two or more tasks and two or more input/output ports.

The method also includes mapping logical objects included in the application source code to physical resources included in a multi-processor array using the plurality of intermediate representations and the connectivity information to generate a resource map (block 703). As described below in more detail, resource mapping may includes assigning specific tasks to particular PEs within a multi-processor array.

The method further includes selecting a respective implementation for each connection in the plurality of connections (block 704). As described below, connections may be identified either explicitly through code provided by the application programmer, or automatically extracted by the Software Tools via an analysis of the source code.

Additionally, the method includes performing a first optimization operation using the plurality intermediate representations to generate a plurality of optimized intermediate representations (block 705). As described below in more detail, such optimization may include better resource mapping to take advantage of the capabilities of the multi-processor array. By performing an optimization after an initial resource map has been determined, the optimization may advantageously improve execution of application software on the multi-processor array.

The method also includes generating executable code using the plurality of optimized intermediate representations (block 706). In various embodiments, generating executable code may include the creation of an image file, portions of which may be executed by respective PEs included in the multi-processor array.

The method also includes loading the executable code onto the multi-processor array (block 707). In some embodiments, portions of an image file of the executable code may be loaded into respective PEs of the multi-processor array. Such loading may employ a communication network that couples the various PEs of the multi-processor array. The method concludes in block 708.

Figure 8:
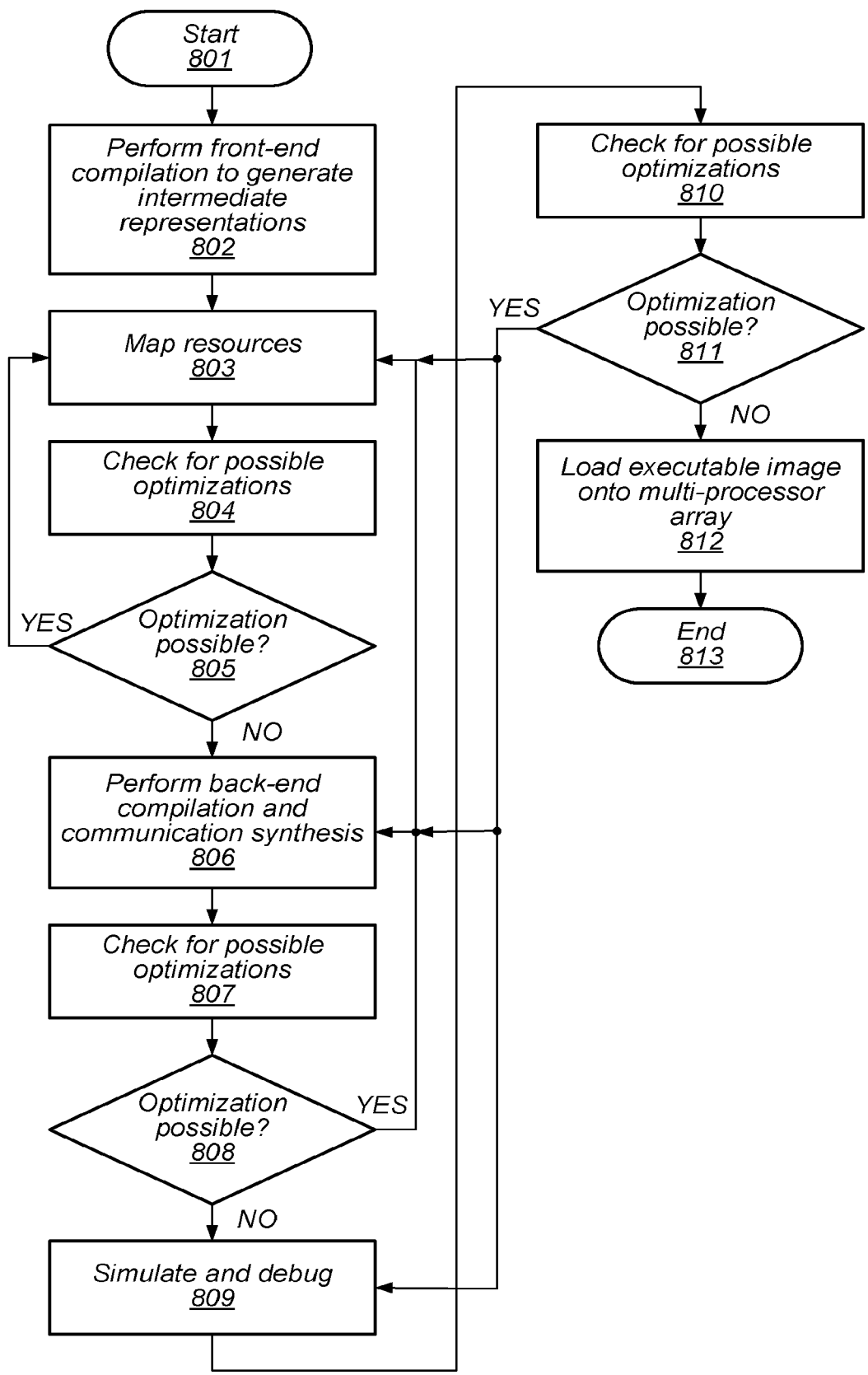
FIG. 8 is a flow diagram depicting an embodiment of a multi-processor compilation flow with optimization.

In some cases, both front-end and back-end optimizations are performed. A flow diagram depicting an embodiment of such a method is illustrated in FIG. 8. The method, which begins in block 801, may be applied to the computer system depicted in FIG. 6. The method includes performing front-end compilation to generate intermediate representations (block 802).

The method further includes mapping resources (block 803). In various embodiments, the information gathered from the intermediate representations may be used to determine which tasks are to be mapped to which PE included in the multi-processor array. The method also includes checking for possible optimizations (block 804). In some cases, the optimizations may involve different mapping of resources than what was originally assigned.

The method then depends on whether optimization is possible (block 805). If optimization if possible, then the method continues from block 803 as described above. Alternatively, if optimization is not possible, then the method includes performing back-end compilation and communication synthesis (block 806).

As with the front-end compilation, the method includes checking for possible optimizations (block 807). The method again depends on whether optimizations are possible (block 808). If optimization is possible, then the method continues from either block 806 or block 803 as described above. If no optimization is possible, then the method includes simulating and debugging (block 809). In some cases, such simulation and debug includes loading the software onto a multi-processor and executing the software. Such execution may include the use of test data and gather results from execution of the software. The results may be compared to expected data.

The method then includes checking for possible optimizations (block 810). In a similar fashion to what was previously described, the method then depends on whether optimization is possible (block 811). If optimization is possible, the method may continue from either block 803, block 806, or block 809 as described above. If not optimization is possible, then then method includes loading an executable image onto a multi-processor array (block 812). The executable image may, in various embodiments, be loaded onto the multi-processor array using the communication network connected between the individual PEs and described above. The method concludes in block 813.

Figure 9:
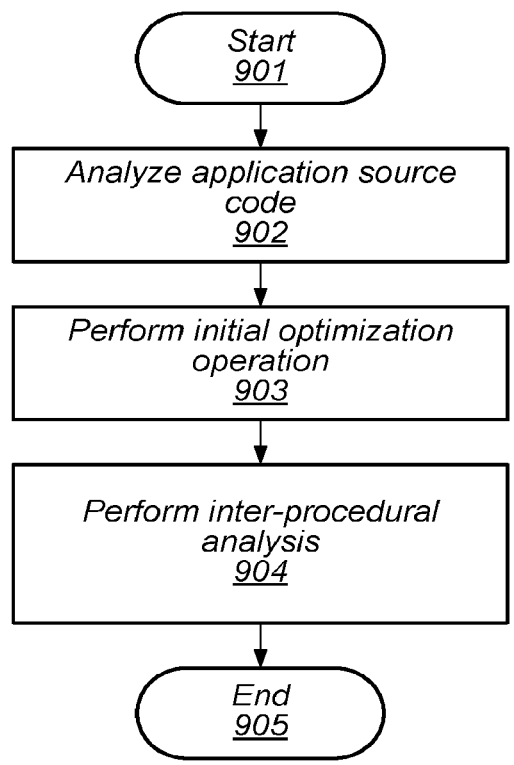
FIG. 9 is a flow diagram depicting an embodiment of a method for performing front-end compilation.

As depicted in FIG. 9, compilers for high-level languages such as C use an intermediate representation (IR) to store intermediate results of the compilation process. The method, which begins in block 901, includes analyzing application source code (block 902). A modern compiler such as LLVM provides a set of components that include a parser to convert the source language to the IR. The method then includes performing an initial optimization operation (block 903). Such initial optimization operations can include one or more optimization passes and an instruction-generator framework to generate program modules comprised of instructions for different target instruction sets such as X86, Arm, etc.

Optimizations are implemented using one or more "lowering" passes, each of which reads an input IR, does a transformation, and outputs a modified IR. Additional passes may be added for any desired transformation. The series of transformations are designed to convert the high-level language constructs to low-level machine features. Traditionally, the compilation steps are executed sequentially and the final pass generates optimized assembly language for the target machine. The assembler and task linker are then run to produce a single object file per task and a database containing all the tasks. This information is then used to identify the connectivity between tasks and store it in the database. There are several important observations regarding the traditional approach.

It is not necessary to run all optimizations to identify the connectivity. Only optimizations to propagate constants and remove dead code are required. These are needed to avoid identifying false connectivity.

It is noted that task linking is not required to produce a single object file per task. Instead, the method includes performing and Inter-Procedural Analysis (IPA) (block 904). IPA is a compiler optimization pass that operates across source code files and produces a single IR per task.

Object code is not a requirement for connectivity identification. It is possible to extract the connectivity from the IRs for the tasks. For the enhanced flow, the front-end compilation process runs only minimum optimization passes and IPA to generate an IR representation for each of the tasks. Relevant information about each task and the IR for each task is stored in the database. The method concludes in block 905.

The flow described above does not generate assembly language until the back-end compilation step. Therefore, assembly source files and inline assembly included in C source files are converted to IR representations that are handled in the same manner as IR generated from C source. This is handled as part of the front-end compilation process.

Of course, assembly language code is generally hand-optimized by the application developer, so the IR generated is at a lower level than the initial IR generated from C source. Fortunately, mixed levels of abstraction are supported in the IR and some additional optimizations may still be possible.

For inline assembly, physical registers that are referenced in the assembly code block are recognized so that the additional information can be used in register allocation during code generation. Alternatively, the flow can support the use of virtual registers in blocks of inline assembly code. These register references are recognized during register allocation and replaced with physical registers at the same time as register allocation is done for code generated from C source.

Connectivity Identification is the final step of the compilation phase. During this step, all connections between tasks are identified. This can be accomplished either explicitly through code provided by the application programmer, or automatically extracted by the Software Tools via analysis.

For automatic communication extraction, information about sending and receiving communication for each of the tasks is stored in the IR during front-end compilation. The extraction process builds a connectivity graph for the entire design. This is done using a combination of declarative information and communication APIs that are available in the IR for the tasks. The connectivity information is stored in the database.

Figure 10:
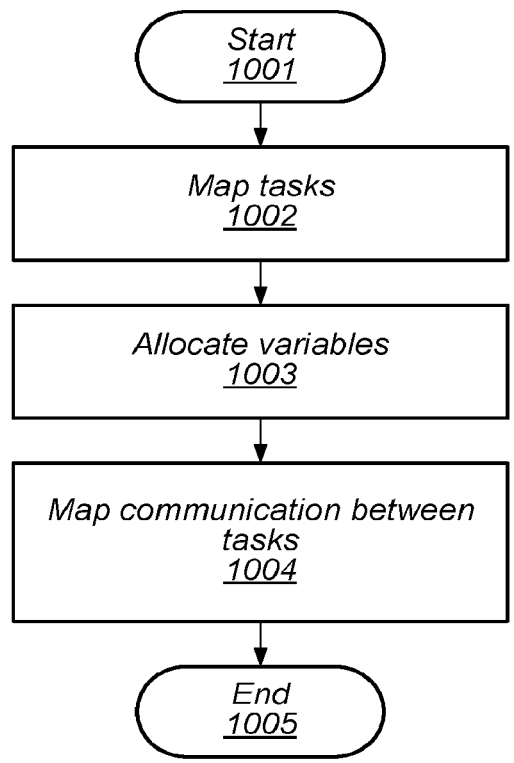
FIG. 10 is a flow diagram depicting an embodiment of a method for performing resource mapping.

Turning to FIG. 10, a flow diagram depicting an embodiment of a method for Resource Mapping is illustrated. The method, which begins in block 1001, is the process of assigning logical objects defined in the application code to physical resources on the hardware. To accomplish this, the method includes mapping tasks (block 1002). For example, different tasks may be mapped to respective PEs. The method further includes allocation variables (block 1003). In some cases, a particular variable is allocated to given one of available data memories.

Additionally, the method includes mapping communication between tasks (block 1104). In some cases, input and output communication is mapped to I/O ports, as well as to other physical resources. The method concludes in block 1005.

It is noted that the order of these operations is important though it may vary for different hardware. On a typical distributed memory array processor, the tasks must be assigned to PEs and the variables and I/O ports involved in communications must be allocated before the communications can be routed. Variables not involved in communications may be placed before or after communication mapping is complete.

Constraints may be provided to Resource Mapping to affect the results. A constraint may be designated as either optional or required. Failure of the Resource Mapper to achieve a required constraint results in a Resource Mapping error. Failure to achieve an optional constraint is acceptable. Some examples of constraints are relative location constraints on tasks and variables, and sharing the same route resources between communications.

Location constraints may be needed to allow access to common resources such as shared memory or to allow access to certain instructions for optimization purposes. If the constraints are met, the Software Tools can utilize the necessary resources for optimal results. If not, a less optimal method may be used based on the resources that are available.

Communication mapping constraints may be used to prevent contention between communications with high bandwidth requirements. Such constraints may be provided manually by a user or automatically by the tools. The latter is common if the user source code includes constructs that require special arrangements of hardware resources for implementation. Constraints may also be provided from down-stream tools in the flow.

Since Task Mapping is done before final code optimizations, it is possible to assign multiple tasks to the same PE without incurring a large overhead for context switching between tasks. A context switch requires saving and restoring state information including registers and variables. Since Register and Variable Allocation is not done until the back-end compiler phase, registers and variables can be allocated across the multiple tasks and the overhead of the context switch can be reduced or removed entirely.

Figure 11:
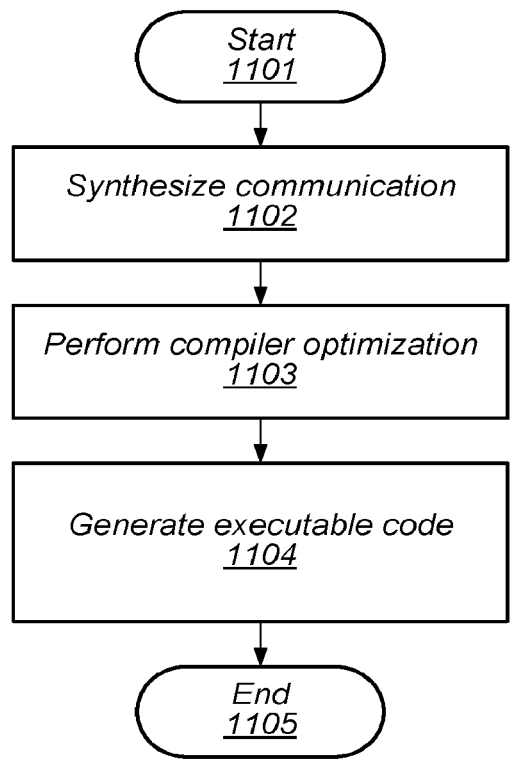
FIG. 11 is a flow diagram depicting an embodiment of a method for performing communication synthesis.

The process of choosing the best mechanism to implement each of the communications and the generation of the appropriate code is called "Communication Synthesis." A flow diagram depicting an embodiment of a method for performing communication synthesis is illustrated in FIG. 11. The method, which begins in block 101, once Resource Mapping is completed. After such Resource Mapping, all the information needed to choose the best implementation for each of the communication APIs is available. The method then includes synthesizing communication (block 1102). For example, Software Tools choose the most efficient implementation based on relative location of the variables involved in the communication and on the hardware resources available. For example, a transfer via direct memory access (DMA) is often the best solution, but if the sender and receiver variables are in the same data memory the best mechanism may utilize shared memory.

Once the communications have all been replaced with actual implementations, the method includes performing compiler optimization (block 1103). Such optimization may include performing one or more optimization passes may be run on the IRs for each of the tasks. The code synthesized for the communication APIs is optimized together with the other code in the task. This is a clear advantage over previous flows where back-end compiler optimizations were done before the code for the communication APIs was synthesized.

Common optimizations executed at this point in the flow may include hardware-specific loop optimizations and oper-and-mode selection to choose the best method of access source and destination operands. In various embodiments, hardware-specific loop optimizations may include repeat loop extraction, loop-invariant code motion, software pipe-lining to hide the latencies of certain PE functions, vectorization to utilize multiple PEs to improve performance, loop unrolling, loop fusion to combine similar loops, and loop fission to split a loop in particular parts.

In some embodiments, operand-mode selection may include register selection for optimal use of hardware registers and variable allocation for optimal assignment of variables to memory addresses.

While many of these optimizations can be done before Resource Mapping is completed, they cannot be done adequately. For example, Register and Variable Allocation is best completed after tasks are fully placed so that scheduling for multi-tasking can be optimized. Loop vectorization is best done after the tasks are assigned to PEs so that available resources in adjacent PEs are known. And, optimizations such as loop-invariant code motion are best done after Communication Synthesis is completed.

The method also includes generating executable code (block 1104). In various embodiments, code generation may include generating object code for each task IR, and generating a final image file that is used to load an application onto the hardware or into a software simulation environment. Depending on the implementation, the first step may involve generation of assembly language source for each task that is then run through an assembler to generate object code.

During code generation, the Software Tools choose the sequence of instructions to implement the original source for each task based on the optimized IR for that task stored in the database. This process may involve special features of the hardware that are available based on the relative location of tasks and variables. For example, some instructions may only be available on certain PEs in the array. If the task is placed on one of those PEs, the special instructions can be used for implementation. In other cases, some instructions may only be available if the source and/or destination variables are in the same memory. If Resource Mapping cannot achieve the necessary colocation of variables, a less optimal implementation is chosen.

The method concludes in block 1105. It is noted that in some cases, after code generation is complete, a final image file is written. This file can be loaded on the actual hardware or loaded into a software simulator or hardware debugger environment for test and debug.

In some cases, prior to loading the executable image onto the multi-processor array, the last step in the tool flow is the simulation step. In various embodiments, the simulation step may include application execution, behavioral testing and debug, performance and timing characterization, and power characterization. Behavioral issues are typically resolved by modifications to the application source code.

There are various requirements for meeting a performance target. In some embodiments, these requirements include requiring all tasks must run fast enough to keep up with the desired throughput, and the data between tasks must flow fast enough so that tasks do not have to wait for data.

Task execution speed may be limited by the number of instructions that the task needs to execute to complete its function. In this case, the problem is alleviated by splitting the task into multiple tasks or by balancing the load by moving some instructions to other tasks. Either of these may be done manually. Alternatively, the simulation stores information that can be used to further optimize the design. For example, if a loop is found to be taking too long to execute, further optimizations such as loop vectorization can be used to improve the results.

Multi-tasking is another valuable tool for load balancing. If an application is developed using many small, fast executing tasks, a single PE may be used to execute all or portions of multiple tasks. If a task is not keeping up with the desired throughput, it can be assigned to a different PE so that it has more available compute resources.

Task execution speed may also be limited by contention for common resources with other tasks. For example, two tasks may be attempting to access the same memory bank at the same time. This can be resolved by reallocating variables to addresses that are in different memory banks or even different memories. This information is gathered during simulation and used to re-allocate the variables.

Delays in transferring data are often due to contention for shared resources. For example, two critical communications may be sharing the same DMA engines or some of the same routing resources. This may cause one of the communications to stall while waiting for the other one to complete. Information about communication stalls is stored during simulation and can be used to improve Task Mapping and Communication Mapping.

Power considerations are also important in many embedded systems. Much like timing performance data, power data saved during simulation runs may be used to improve optimizations during Resource Mapping, Communication Synthesis, and Back-End Compilation.

In some cases, static analysis can be used to find some of the same performance limitations as simulation without requiring specific test data. For example, it may be possible to use static analysis to find potential memory bank conflicts or possible communication conflict. This information is also supplied to Resource Mapping, Communication Synthesis, and Back-End Compilation to optimize results.

An iterative flow is one in which information gathered in a later step in the flow is fed back to a previous step in the flow. Some or all the previous steps are then re-executed to further optimize the design. For example, code optimizations may cause certain variables to be added or deleted thus necessitating a partial re-run of Resource Mapping to adjust the variable placement. Or, information gathered from simulation or static analysis may be used to iterate over earlier steps to further optimize the design. This is possible since the database includes the IR for all the application tasks. Optimization passes may be run as needed.

In various embodiments a computer-readable memory medium may store program instructions executable by the processors of the MPS and/or one or more external processors to implement various functions described above, such as functions involved in swapping software applications. Generally, the computer-readable memory medium may include any set of instructions which, when executed, implement a portion or all of the functions described herein. Generally speaking, a computer-readable memory medium may include any storage media accessible by a computer during use to provide instructions and/or data to a computer system. For example, a computer-readable memory medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method, comprising:
by a multi-processor array comprising a plurality of processors interspersed among a plurality of memories;
performing a front-end compilation using application source code to generate a plurality of intermediate representations and connectivity information, wherein a particular intermediate representation of the plurality of intermediate representations corresponds to a particular task of a plurality of tasks, wherein the connectivity information includes a plurality of connections, and wherein a particular connection specifies a communication between a first task of the plurality of tasks and a second task of the plurality of tasks;
mapping logical objects included in the application source code to physical resources included in the multi-processor array using the plurality of intermediate representations and the connectivity information to generate a resource map, wherein mapping the logical objects to the physical resources is constrained by one or more of a plurality of constraints;
selecting a respective implementation for each connection in the plurality of connections;
performing a first optimization operation using the plurality of intermediate representations to generate a plurality of optimized intermediate representations, wherein the first optimization operation modifies the mapping of the logical objects to the physical resources to assign multiple tasks to a single processor of the plurality of processors while avoiding one or both of saving and restoring state information;
generating executable code using the plurality of optimized intermediate representations; and
loading the executable code onto the multi-processor array.

2. The method of claim 1, wherein the plurality of constraints includes one or more required constraints and one or more optional constraints.

3. The method of claim 2, further comprising, generating a mapping error in response to determining that a given one of the one or more required constraints could not be satisfied.

4. The method of claim 2, further comprising, selecting the respective implementations for the plurality of connections, in response to determining that a given one of the one or more optional constraints could not be satisfied.

5. The method of claim 1, wherein the plurality of constraints includes a plurality of location constraints and a plurality of communication constraints.

6. The method of claim 1, wherein a particular processor of the plurality of processors includes a data memory, and wherein mapping the logical objects includes:
assigning a particular task of the plurality of tasks to the particular processor of the plurality of processors; and
assigning a variable associated with the particular task to the data memory.

7. The method of claim 1,
wherein the state information comprises one or both of registers and variables.

8. A computer system, comprising:
a multi processor array comprising:
a plurality of memories configured to store instructions; and
a plurality of processors interspersed among the the plurality of memories and configured execute instructions to cause the computer system to perform operations including:
performing a front-end compilation using application source code to generate a plurality of intermediate representations and connectivity information, wherein a particular intermediate representation of the plurality of intermediate representations corresponds to a particular task of a plurality of tasks, wherein the connectivity information includes a plurality of connections, and wherein a particular connection specifies a communication between a first task of the plurality of tasks and a second task of the plurality of tasks;

mapping, using the plurality of intermediate representations, the connectivity information and a plurality of constraints, logical objects included in the application source code to physical resources included in the multi-processor array to generate a resource map;

selecting a respective implementation for each connection in the plurality of connections;

performing a first optimization operation using the plurality of intermediate representations to generate a plurality of optimized intermediate representations, wherein the first optimization operation modifies the mapping of the logical objects to the physical resources to assign multiple tasks to a single processor of the plurality of processors while avoiding one or both of saving and restoring state information;

generating executable code using the plurality of optimized intermediate representations; and loading the executable code onto the multiprocessor array.

9. The computer system of claim 8, wherein the plurality of constraints includes one or more required constraints and one or more optional constraints.

10. The computer system of claim 9, wherein the operations further include generating a mapping error in response to determining that a given one of the one or more required constraints could not be satisfied.

11. The computer system of claim 9, wherein the operations further include selecting the respective implementation for the plurality of connections, in response to determining that a given one of the one or more optional constraints could not be satisfied.

12. The computer system of claim 8, wherein the plurality of constraints includes a plurality of location constraints and a plurality of communication constraints.

13. The computer system of claim 8, wherein the multi-processor array includes a plurality of processors, wherein a particular processor of the plurality of processors includes a data memory, and wherein mapping the logical objects includes:

assigning a particular task of the plurality of tasks to the particular processor of the plurality of processors; and assigning a variable associated with the particular task to the data memory.

14. The computer system of claim 8, wherein the operations further include:

simulating the executable code to generate a simulation result; and modifying at least the application source code based on the simulation result.

15. A non-transitory computer-accessible storage medium having programming instructions stored therein that, in response to execution by a computer system, causes the computer system to perform operations comprising:

performing a front-end compilation using application source code to generate a plurality of intermediate representations and connectivity information, wherein a particular intermediate representation of the plurality of intermediate representations corresponds to a particular task of a plurality of tasks, wherein the connectivity information includes a plurality of connections, and wherein a particular connection specifies a communication between a first task of the plurality of tasks and a second task of the plurality of tasks;

mapping, using the plurality of intermediate representations, the connectivity information and a plurality of constraints, logical objects included in the application source code to physical resources included in a multi-processor array of the computer system to generate a resource map, wherein the multi-processor array comprises a plurality of processors interspersed among a plurality of memories;

selecting a respective implementation for each connection in the plurality of connections;

performing a first optimization operation using the plurality of intermediate representations to generate a plurality of optimized intermediate representations, wherein the first optimization operation modifies the mapping of the logical objects to the physical resources to assign multiple tasks to a single processor of the plurality of processors while avoiding one or both of saving and restoring state information;

generating executable code using the plurality of optimized intermediate representations; and loading the executable code onto the multi-processor array.

16. The non-transitory computer-accessible storage medium of claim 15, wherein the plurality of constraints includes one or more required constraints and one or more optional constraints.

17. The non-transitory computer-accessible storage medium of claim 16, wherein the operations further include generating a mapping error in response to determining that a given one of the one or more required constraints could not be satisfied.

18. The non-transitory computer-accessible storage medium of claim 16, wherein the operations further include selecting the respective implementation for the plurality of connections, in response to determining that a given one of the one or more optional constraints could not be satisfied.

19. The non-transitory computer-accessible storage medium of claim 15, wherein the plurality of constraints includes a plurality of location constraints and a plurality of communication constraints.

20. The non-transitory computer-accessible storage medium of claim 15, wherein the multi-processor array includes a plurality of processors, wherein a particular processor of the plurality of processors includes a data memory, and wherein mapping the logical objects includes:

assigning a particular task of the plurality of tasks to the particular processor of the plurality of processors; and assigning a variable associated with the particular task to the data memory.

* * * * *